United States Patent [19]

Janelid

[11] 3,986,339

[45] Oct. 19, 1976

[54] STORING A SUBSTANCE WHICH, AT ATMOSPHERIC PRESSURE, HAS A BOILING POINT BELOW 0°C

[76] Inventor: Erik Ingvar Janelid, Forsetevagen 18, Djursholm, Sweden

[22] Filed: Mar. 18, 1975

[21] Appl. No.: 559,533

[30] Foreign Application Priority Data

Mar. 19, 1974 Sweden .............................. 7403711

[52] U.S. Cl. ........................................ 62/45; 61/.5; 62/260; 165/45
[51] Int. Cl.² ...................... B65G 5/00; E21F 17/16
[58] Field of Search ...................... 62/45, 260; 61/.5; 165/45; 220/85 VR

[56] References Cited
UNITED STATES PATENTS

| | | | |
|---|---|---|---|
| 2,849,150 | 8/1958 | Tompkins Jr. ................. | 220/85 VR |
| 2,932,170 | 4/1960 | Patterson et al. ...................... | 62/260 |
| 3,385,067 | 5/1968 | Van Eek .................................... | 61/.5 |
| 3,670,503 | 6/1972 | Janelid .................................... | 61/.5 |
| 3,742,716 | 7/1973 | Backstrom .............................. | 61/.5 |
| 3,848,427 | 11/1974 | Loofbourow .......................... | 62/260 |

*Primary Examiner*—William F. O'Dea
*Assistant Examiner*—Ronald C. Capossela
*Attorney, Agent, or Firm*—Toren, McGeady and Stanger

[57] ABSTRACT

Liquid natural gas is stored in a rock chamber. Some liquid gas is vaporized because of the natural heat flow from the surrounding rock. Said gas is conveyed to a second rock chamber serving as a buffer store. Some gas leaks out through cracks in the rock. Said leaking gas is collected in channels provided in the rock around the rock chamber, and is also conveyed to the buffer store. Gas is supplied to the consumers from the buffer store.

9 Claims, 1 Drawing Figure

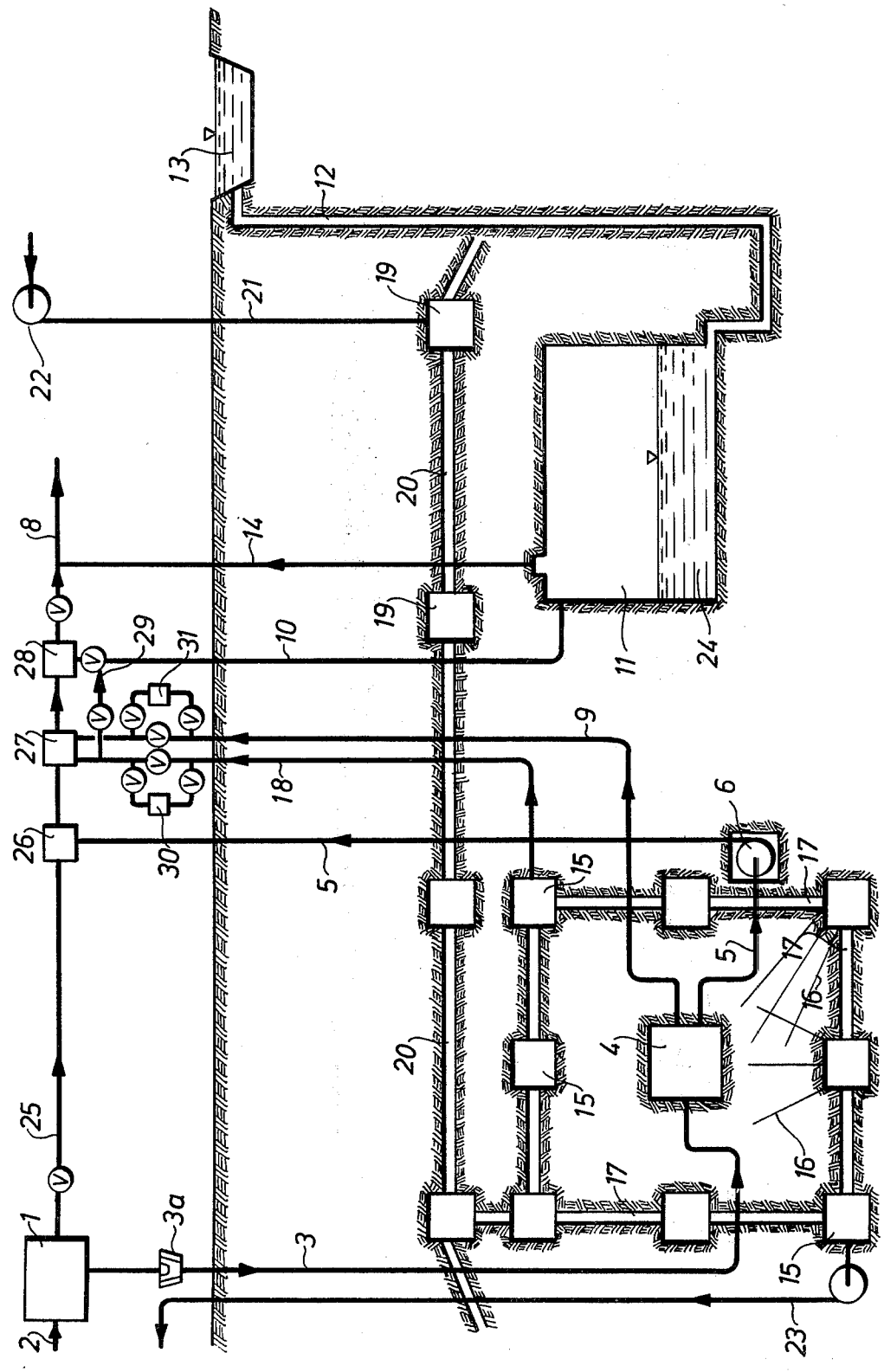

STORING A SUBSTANCE WHICH, AT ATMOSPHERIC PRESSURE, HAS A BOILING POINT BELOW 0°C

The invention relates to a method and a plant for storing a substance which, at atmospheric pressure, has a boiling point below 0° C. In the following the invention will be described solely with respect to storing and distributing liquid natural gas which, at atmospheric pressure, has a boiling point of about −160° C. However, it is understood that the invention can also be used for storage and distribution of other substances.

It is an object of the invention to store liquid natural gas in a way which is very safe and which does not pollute the environment. It is another object of the invention to utilize the natural heat of the rock for vaporizing liquid natural gas. It is another object of the invention to provide a liquid natural gas storing method in which a large quantity of vaporized gas is always available to meet peak load demands. It is another object of the invention to produce a method of storing liquid natural gas in a rock chamber while permitting some leakage of natural gas into the surrounding rock, thus making it unnecessary to make the walls of the rock chamber entirely gas-tight.

Attempts have been made to store cooled, liquid natural gas in rock chambers, but so far without satisfactory results. The main problem is to seal the rock chamber so that the substance in gaseous or liquid phase does not disappear through cracks in the rock. Another problem also occurs from time to time, that of how to deal with the gas formed by vaporization of the liquid natural gas in the rock chamber and in cracks in the vicinity, caused by the constant flow of natural heat from the surrounding rock. Admittedly, if the gas cannot be consumed, it can be cooled and condensed to liquid form and returned to the rock chamber, but this is an expensive process. Conventional methods used hitherto have been unable to make use of the excess gas formed upon vaporization in an economically satisfactory manner. According to the invention this unavoidable vaporization is utilized by conveying the gas formed, which cannot be used immediately, to a buffer store in the form of a second rock chamber, preferably a hydraulic storage space.

The method of the invention comprises storing the substance in cooled, liquid form in a first rock chamber, providing channels in the rock around said first rock chamber to collect substance leaking out of said first rock chamber through cracks in the rock, vaporizing liquid substance in said first rock chamber by means of the natural heat flow from the surrounding rock, and conveying said collected substance and said vaporized substance to a buffer store in the form of a second rock chamber. The plant of the invention comprises a first rock chamber for storing the substance in cooled, liquid form, channels in the rock around said first rock chamber to collect substance leaking out of said first rock chamber through cracks in the rock, a buffer store in the form of a second rock chamber for storing the substance in gaseous form, means for conveying collected substance from said channels to said second rock chamber, and means for conveying gaseous substance from said first rock chamber to said second rock chamber, said gaseous substance having been produced by the vaporization of liquid substance by the natural heat flow from the surrounding rock.

The method of the invention makes it possible to permit natural gas to leak out from the first rock chamber into the rock surrounding the rock chamber. As will be described below it is on special occasions desired that the natural gas leaks out from the first rock chamber. Generally, however, it is desired to keep the leakage low. Various methods for reducing the leakage are known. For example, the rock mass around the rock chamber can be injected with a sealing fluid which solidifies in the cracks. This sealing fluid is preferably pressed into the rock from galleries located outside the rock chamber. It is also desirable for the rock chamber to be surrounded by curtains of drill holes connecting said galleries. The galleries and drill-hole curtains are preferably located so far from the rock chamber that the rock temperature there exceeds 0° C. The rock mass outside said galleries and drill holes can be made gastight by injecting water under pressure so that the hydrostatic gradient exceeds 1. The drill holes in the curtains should be placed so close together that open cracks from the rock chamber which may not have been sealed by the injection of sealing fluid, will be drained through the drill holes. Natural gas leaking out in this way will be collected in the galleries and this unavoidable vaporization is utilized by conveying the gas formed, which cannot be used immediately, to a buffer store in the form of a second rock chamber, preferably a hydraulic storage space. By making the gas pressure in the curtain slightly exceed the pressure in the rock chamber, the leakage can be kept low. In the unlikely event of a marked leakage path from the rock chamber occurring, the injection process from the galleries can be supplemented.

Finally, a heat zone can be arranged relatively far outside and around the rock chamber, which will seal the rock.

The fact that the rock around a rock chamber can be made practically tight does not, however, imply that vaporization of the liquid natural gas is prevented. Copious quantities of vapour will be formed by the natural heat constantly supplied by conduction from the surrounding rock. The vapour must be successively removed as the pressure in the rock chamber would otherwise rise. According to the invention the vapour thus formed is conveyed to the buffer store. During peak load periods, however, said vapour may be conveyed directly to the consumers.

The liquid natural gas in the first rock chamber may be kept at atmospheric pressure. The vapor conveyed to the second rock chamber is preferably compressed. The result of the high pressure is that the volume of the second rock chamber can be kept comparatively low. It is also advisable for the second rock chamber to be in communication with a water reservoir so that it can be filled with water to any desired level, thus making it possible to control the effective volume of said second rock chamber. When using such a hydraulic storage space the vapor conveyed from the first to the second rock chamber should be heated, so that the temperature in the second rock chamber is above the freezing point. Permanent communication with the water reservoir at a higher level means that the gas pressure can be kept substantially constant.

In the following the invention will be further explained with reference to the accompanying drawing which shows a liquid natural gas storage and delivery plant according to the invention. The plant illustrated comprises an intermediate container 1 located above ground, to which liquid natural gas is pumped through a pipe 2 from a ship. The intermediate container 1 is in communication through a pipe 3, provided with a compressor 3a, with a rock chamber 4 for liquid natural gas. Liquid natural gas can be withdrawn from the rock chamber 4 through a pipe 5, provided with a pump 6, and conveyed to a pump 26, a heat exchanger 27, and a compressor 28. The liquid natural gas vaporized in the heat exchanger 27 is conveyed to the consumers through a distribution pipeline 8. The vapour formed in the rock chamber 4 by the natural heat flow from the surrounding rock is led through a pipe 9 to the heat exchanger 27, if desired through a compressor 31. If the gas produced in the heat exchanger 27 cannot be distributed immediately, it is led from the compressor 28 through a pipe 10 to a rock chamber 11 which acts as buffer store for gas. The lower part of the rock chamber 11 contains water 24 and is in communication with a lake 13 or some other supply of water, by means of a shaft 12. When gas is pumped into the rock chamber, the water level in the rock chamber drops. The gas pressure in the rock chamber 11 is thus kept substantially constant. When required, gas is withdrawn from the rock chamber 11 through a pipe 14 connected to the distribution pipeline 8.

Several galleries 15 extend around the rock chamber 4. The galleries are located so far from the rock chamber 4 that the temperature in the galleries is preferably above freezing, i.e. 0° C. Two series of drill holes are drilled from the galleries 15, a first series 16 directed substantially in the direction of the rock chamber 4, and a second series 17 connecting the galleries with each other. Though not illustrated in the drawing, it is understood that holes 16 have been drilled from all the galleries 15.

The drill holes 16 are used to seal the rock by injecting a sealing agent in a manner known per se. The drill holes 17 are intended to catch any leakage of natural gas from the rock chamber 4. The drill holes 17 are placed so close together, for example 2 meters apart, that any crack in the rock which might contain natural gas is drained through the drill holes. Any leakage of natural gas will therefore be collected in the galleries and conducted through a pipe 18 to the heat exchanger 27 and from there — depending on the quantity of gas required for consumption — it will either be led out for distribution or pumped to the buffer store 11. If it is found that the gas in the pipe 18 need not be heated in the heat exchanger 27 it can be conveyed directly to the buffer store 11 through a compressor 30, a pipe 29, and the pipe 10.

If all larger cracks in the rock are sealed, a certain difference in gas pressure may be advisable between the rock chamber 4 on the one hand and the galleries 15 and drill holes 17 on the other. If, namely, the gas pressure in the galleries and drill holes is higher than in the rock chamber, liquid natural gas will be prevented from penetrating into the remaining minor cracks from the chamber 4. Conversely, by lowering the pressure in the galleries and drill holes, liquid natural gas can be made to penetrate out into said cracks in the rock. Upon contact with the warmer rock vaporization will rapidly take place, and the vapour thus formed will be collected by the drill holes 17 and the galleries 15, and will be conveyed to the distribution pipe 8 or to the buffer chamber 11 as described above. This intentional leakage of liquid natural gas into the surrounding rock is useful if a temporary increase is desired in the productions of the gaseous product, for example for meeting peak load demands. This way of utilizing the natural heat in the rock may be particularly valuable during the first year after the rock chamber has been taken into use, while the temperature in the rock nearest the rock chamber is still falling. The gas pressures in the rock chamber 4 and in the galleries 15 and drill holes 17 is regulated by means of the valves illustrated in the pipes 9, 18, or by compressors or pumps in said pipes.

A plurality of galleries 19, interconnected by drill holes 20, have been made in the rock above the rock chambers 4, 11. Water can be supplied under pressure from a pump 22 via a conduit 21. A water curtain is thus produced in the rock, preventing natural gas from penetrating up to the surface of the ground through cracks in the rock. The pressure in the water curtain should be higher than the pressure in the rock chambers 4, 11. The sealing water curtain formed in this manner is particularly advantageous if the rock chambers 4, 11 are to be located at such a slight depth that the pressure of the natural groundwater (subsoil water) is too low to prevent leakage of natural gas. A certain amount of water can be forced into the galleries 15 and drill holes 17, and a conduit 23 containing a pump is therefore provided to pump away this water.

What is claimed is:

1. A method for storing a substance having a boiling point below 0° C at atmospheric pressure comprising the steps of storing said substance in a cooled liquid form in a first subterranean rock chamber, providing channels in the rock surrounding said first rock chamber to collect substance leaking from said first rock chamber through cracks in the rock, vaporizing liquid substance in said first rock chamber by means of the natural heat flow from the surrounding rock, conveying said collected substance and said vaporized substance to a buffer store in the form of a second subterranean rock chamber, and heating said substance to a temperature above 0° C while conveying said substance to said second rock chamber.

2. A method according to claim 1 including the further step of controlling the flow of substance leaking from said first rock chamber to said channels by regulating the pressure in said channels relative to the pressure in said first rock chamber.

3. A method according to claim 1 comprising the further step of compressing the gaseous substance while conveying it to said second rock chamber.

4. A method according to claim 1 including the step of selectively adjustably maintaining a quantity of water in said second rock chamber to thereby control the effective volume thereof.

5. A plant for storing a substance having a boiling point below 0° C at atmospheric pressure comprising a first subterranean rock chamber for storing said substance in a cooled liquid form, channels formed in the rock surrounding said first rock chamber effective to collect portions of said substance leaking out of said first rock chamber through cracks in the surrounding rock, a buffer store consisting essentially of a second subterranean rock chamber for storing said substance in gaseous form, means for conveying collected substance from said channels to said second rock chamber, means for conveying gaseous substance from said first rock chamber to said second rock chamber, said gaseous substance having been produced by the vaporization of liquid substance by the natural heat flow from the surrounding rock, and means for heating gaseous substance being conveyed from said first rock chamber to said second rock chamber to a temperature above 0° C.

6. A plant according to claim 5 wherein said channels are situated at a distance from said first rock chamber such that the temperature in said channels is above 0° C.

7. A plant according to claim 5 further comprising means for compressing gaseous substance being conveyed from said first rock chamber to said second rock chamber.

8. A plant according to claim 5 further comprising a body of water and a conduit for establishing flow communication between said body of water and said second rock chamber for controlling addition and withdrawal of water to and from said second rock chamber thereby to control the effective storage volume of said second rock chamber.

9. A plant acccording to claim 8 wherein said body of water is a natural body of water.

* * * * *